United States Patent
Hayes

(10) Patent No.: US 6,769,235 B1
(45) Date of Patent: Aug. 3, 2004

(54) ANIMAL TRAINING SYSTEM

(76) Inventor: Barry D. Hayes, 959 County Rd. 730, Clanton, AL (US) 35046

(*) Notice: Subject to any disclaimer, the term of this patent is extended or adjusted under 35 U.S.C. 154(b) by 0 days.

(21) Appl. No.: 10/383,989

(22) Filed: Mar. 8, 2003

(51) Int. Cl.[7] ............................ B68B 1/00; A01K 15/00
(52) U.S. Cl. .................. 54/71; 54/1; 119/859
(58) Field of Search .................. 54/1, 71; 119/856, 119/859; 231/7

(56) References Cited

U.S. PATENT DOCUMENTS

| | | | |
|---|---|---|---|
| 350,646 A | 10/1886 | Tiffany | |
| 378,153 A | 2/1888 | Tiffany | |
| 477,644 A | 6/1892 | Chambers, Jr. | |
| 647,102 A | 4/1900 | Marshall | |
| 780,242 A | 1/1905 | Stirling | |
| 934,449 A | * 9/1909 | Leech et al. | 54/71 |
| 988,152 A | 3/1911 | Sund | |
| 1,045,308 A | 11/1912 | McManigal | |
| 1,575,515 A | * 3/1926 | Adams | 54/1 |
| 3,161,005 A | 12/1964 | Ackerson | |
| 3,687,112 A | 8/1972 | Henderson | |
| 4,015,405 A | 4/1977 | Westlund | |
| 4,128,200 A | * 12/1978 | Jones et al. | 231/7 |
| 4,190,968 A | 3/1980 | Clapp et al. | |
| 4,199,921 A | 4/1980 | Watkins | |
| 4,453,371 A | 6/1984 | Abbott-Davies | |
| 5,335,626 A | 8/1994 | Calabrese | |
| 5,755,185 A | 5/1998 | Gallagher | |
| 6,170,439 B1 | 1/2001 | Duncan et al. | |
| 2004/0000274 A1 | * 1/2004 | James | 119/859 |

FOREIGN PATENT DOCUMENTS

| | | | | |
|---|---|---|---|---|
| DE | 3802861 A1 | * 8/1989 | | A01K/11/00 |
| GB | 2 161 689 A | 1/1986 | | |

* cited by examiner

*Primary Examiner*—Robert P. Swiatek
(74) *Attorney, Agent, or Firm*—C. Brandon Browning; Sirote & Permutt, P.C.

(57) ABSTRACT

An animal training system adapted to be fitted on a quadruped for providing increased control over the quadruped by a trainer and instilling confidence in the quadruped. The harness includes a first shoulder strap having a first adjustable retaining strap associated therewith for positioning the shoulder strap across the shoulders of the quadruped and a buttock strap having a second adjustable retaining strap associated therewith for positioning the buttock strap across the buttocks of the quadruped, the shoulder strap and the buttock strap being adjustably connected and arranged to extend completely around the quadruped in a close-fitting fashion in order to exert pressure against the shoulders and the buttocks of the quadruped. The harness can include a number of sites for attaching shocking devices that when activated apply an electrical shock to the quadruped and thereby elicit a desired behavior from the quadruped.

26 Claims, 4 Drawing Sheets

ANIMAL TRAINING SYSTEM

FIELD OF THE INVENTION

This invention relates to an animal training system, and more particularly, to an adjustable quadruped training harness adapted to be fitted on a quadruped for providing increased control over the quadruped by a trainer during training sessions and for instilling confidence in the quadruped. The harness includes a shoulder strap having a first adjustable retaining strap associated therewith for positioning the shoulder strap across the shoulders of the quadruped and a buttock strap having a second adjustable retaining strap associated therewith for positioning the buttock strap across the buttocks of the quadruped, the shoulder strap and the buttock strap being adjustably connected and arranged to extend completely around the quadruped in a close-fitting fashion in order to exert pressure against the shoulders and the buttocks of the quadruped. A fastening ring is centrally located on the shoulder strap to provide a point of attachment of the harness to a lead rope to enable a trainer to exhibit control over the quadruped. To provide further control over the quadruped, the harness includes a number of sites for attaching shocking devices that when activated apply an electrical shock to the quadruped and thereby elicit a desired behavior from the quadruped. While the invention is described for use in relation to a horse, it is necessarily understood that the invention may be utilized with other animals, such as cattle, dogs and the like. The horse is utilized for ease of description and since horses generally provide for the majority of use of a system as described.

BACKGROUND OF THE INVENTION

Horses are trained for various functions or performances. Among such are: loading into a trailer, reigning, leading, driving and breeding. Various horse harnesses are known in the art for facilitating these activities. For example, U.S. Pat. No. 4,015,405 to Westlund describes a harness including a characteristic and essential adjustable two part top strap, a tail strap connected to the top strap, inverted U shaped rear and front cross straps of affixed to the top strap, an adjustable strap hanger suspended from each end of each of the cross straps, a breast strap adjustably connected to the front strap hanger and a body strap supported by the strap hangers having two side parts of an elastic material, a U shaped hind part and a U shaped front part. From a practical standpoint, the obvious shortcoming of Westlund is its complexity. No less than nine buckles and fourteen straps, including the characteristic and essential two part top strap, are required to accomplish the objects of Westlund. Thus, the Westlund harness is not practical for use in situations where a trainer needs to quickly and easily fit a harness onto a horse in order to bring the horse under control. Furthermore, the Westlund harness includes hooks and rings that protrude outward from the harness that can catch on objects and other horses thereby injuring or entangling the horse. As such, the Westlund harness is not arranged to be left on an unattended horse. Lastly, the Westlund harness fails to include attachment points for connecting remotely activated shocking devices or means of maintaining straps in a close-fitting, strategic position for maximizing the effects of the shocking devices. Accordingly, the Westlund harness does not enable a trainer to influence a horse's behavior from afar.

U.S. Pat. No. 3,161,005 to Ackerson describes an electrical animal training device for training a horse to stop, back-up and turn right and left. The device includes a harness having a pair of spaced apart parallel electric leads each provided with a series of spaced contact points and a portable electric current generator for supplying electric current to the contact points. The contact points are arranged to be positioned at an area adjacent the horse's neck where they make contact with the horse's skin. The device can also be incorporated into a breast collar that is attached to a saddle by an extension of the breast collar. The breast collar is used to train the horse to back-up or stop by transmitting an electric shock to its chest from contact points in the breast collar. The device is controlled by a rider who can energize the harness by touching a button control. Like Westlund, the Ackerson harness does not allow a trainer to remotely apply an electrical shock to a horse. Furthermore, although Ackerson utilizes electrical shocking devices to influence a horse, Ackerson does not provide any way of influencing a horse to move forward, in particular, a buttock portion supporting an electrical shocking device.

The present invention overcomes the shortcomings of the prior art by providing a simple to use and inexpensive harness having a minimal number of parts that is capable of providing a trainer a multitude of options and training methods for quickly and efficiently training a horse.

OBJECTS AND SUMMARY OF THE INVENTION

A primary object of the invention is to provide a humane training harness that instills in a horse on which it is fitted confidence in a trainer.

A further primary object of the invention is to provide a training harness that can be left on an unattended horse for an extended amount of time, for example, between training sessions and that does not substantially hinder the movement of the horse about an area.

A further primary object of the invention is to provide an animal training harness that can be placed on small and large animals alike.

A further primary object of the invention is to provide a training harness that simultaneously exerts pressure across the shoulders and buttocks of a horse when the horse is at rest.

A further primary object of the invention is to provide a training harness that allows a trainer to create pressure on the buttocks of the horse, in addition to pressure exerted by the harness on a horse when the horse is at rest.

A further primary object of the invention is to provide a training harness that allows pressure exerted against the buttocks of the horse when the harness is being led by a trainer using a lead rope attached to the harness to be transferred to the front of the shoulders of the horse when the trainer stops pulling on the lead strap.

Another object of the invention is to provide a training harness that allows a trainer to increase the leverage on a horse when pulling the horse, for example, when attempting to load the horse into a trailer.

Another object of the invention is to provide a horse harness that provides means of preventing a horse form cribbing, pawing, rearing up and fighting.

Another object of the invention is to provide a training harness that allows a trainer to influence a horse to move forward, backward, to the right and to the left.

Another object of the invention is to provide a training harness that allows a trainer to influence the behavior of a horse from a location remote from the horse.

The objects of the invention are accomplished by providing a harness including a flexible yet substantially unstretchable first portion adapted to extend around a horse and fit snuggly against the shoulders and buttocks thereof and a suspension system for maintaining the first portion on the horse at predetermined positions thereabout. The first portion can be divided into a shoulder portion adapted to extend across the shoulders of the horse, a pair of spaced apart, parallel flank portions connected with the shoulder portion and arranged to extend across the respective sides of the horse and a buttock portion connected with the pair of opposing flank portions and arranged to extend across the buttocks of the horse.

At each point of connection between the shoulder portion and the flank portions and the flank portions with the buttock portion, the connections can be fixed or adjustable. Where a connection is fixed, it is preferred that the respective portions be joined using a circular member such as a metal ring having an opening therethrough, although any shape will suffice, such as square or triangular, and an opening is not required. It is further preferred that the circular member be able to withstand any force exerted thereon by the horse without bending or breaking in the event the member is used to tie the horse off to a stationary object. Thus, such members should be able to withstand at least 1000 lbs. where the harness is designated for a horse. Where a connection is adjustable, it is preferred that a double-ring fastener is used, although other types of fasteners are suitable, for example, buckles, adhesives, hook and pile, locking pins and the like. The only requisite for such an adjustable fastener is that it be able to withstand forces applied thereto by the type of animal for which it is designed.

The suspension system can be any suspension system capable of maintaining the shoulder portion and the buttock portion at a desired location on a horse. Preferably, the suspension system includes a pair of spaced apart adjustable retaining portions that are slidably or fixedly connected with the first portion and arranged such that when the harness is fitted onto the horse, the retaining portions extend substantially perpendicularly across the back of the horse and attach at the ends thereof to the first portion. The desired location for positioning the shoulder portion can change depending on the training method employed by the trainer and the type of animal involved, however, for purposes of describing the invention for use with a horse, the desired location for the shoulder portion is across the shoulders of the horse and preferably across the points of the shoulders of the horse. To maintain the shoulder portion across the shoulders of the horse, it is preferred that one retaining portion be connected with the shoulder portion and be adjustable to raise or lower the shoulder portion in relation to the horse. This way, the harness can be adjusted to fit any size horse. Similarly, the desired location for maintaining the buttock portion depends on the training method employed and the type of animal involved. For a horse, it is preferred that the buttock portion be maintained across the buttocks of the horse and preferably about the stifles. To maintain the buttock portion across the buttocks of the horse, it is preferred that one retaining portion be connected with the buttock portion and be adjustable to raise or lower the buttock portion in relation to the horse. It is anticipated that the buttock portion can be maintained at the desired location with a retaining portion connected with the flank portions.

Each retaining portion can be divided into at least two parts that are connectable using any of the adjustable or fixed connection means described above. Furthermore, the retaining portions can also be extended to extend completely around the barrel of the horse to provide greater stability of the harness on the horse.

The various portions, i.e., the first portion, the shoulder portion, the flank portions, the buttock portion and the retaining portions, can be constructed of any sufficiently pliable yet durable material capable accomplishing the objects of the invention. As such, the portions can be constructed of fabrics made from woven cotton, nylon, polypropylene or any other natural or synthetic material or from leather, plastic or metal straps.

In use, the harness is fitted onto a horse with the first portion adjusted such that the shoulder portion and the buttock portion fit somewhat snuggly against the shoulders and buttocks, respectively, of the horse. Thereafter, the retaining portions are adjusted to position and maintain the shoulder portion across the shoulders, and more particularly, across the points of the shoulders of the horse and the buttock portion across the buttocks of the horse, preferably, about the stifles. Once the harness is fitted onto the horse, a trainer can perform any of a number of exercises with the horse.

To lead a horse, a lead rope is attached to a loop or the like centrally located about the length of the shoulder portion and threaded through a bridle on the horse. When the lead rope is pulled, the horse's head is gently pulled downward thereby preventing the horse from rearing up. This provides the trainer with additional leverage and control over the horse while allowing the horse to move its head right to left. Further, by pulling on the loop of the shoulder portion, pressure is exerted by the buttock portion across the buttocks of the horse in addition to the amount of pressure exerted by the buttock portion when the horse is at rest. This additional pressure across the buttocks convinces or tricks the horses into believing that there is something or someone pushing the horse from behind. This causes the horse to move forward with confidence. When the trainer stops pulling on the lead rope, the additional pressure exerted against the buttocks of the horse is removed and transferred forward to the shoulder portion. The transferal of pressure from the buttocks to the shoulders of the horse communicates to the horse that it should stop. Thus, the harness of the invention provides novel and humane means of reassuring a horse to move forward or stop.

The harness of the present invention can also be used to immobilize a horse when desired, for example, while grooming or shoeing the horse. To do so, the horse is stationed between stationary objects such as four posts arranged in a square or rectangular configuration. A line is extended from each of the posts and attached to the harness at one of the connection points, such as, a metal ring or double ring fastener. Preferably, a line is attached to a connection point of the harness about the area of each leg of the horse. It is further preferred that each line be kept taunt and be connected to the respective post at a height substantially lower than the first portion of the harness such that downward pressure is exerted on the horse. This way, the horse is prevented from lifting a leg, and the horse can be shoed without fear of being kicked. In addition, lines can be extended from either side of a bridle and connected to one of the retaining portion in order to prevent the horse from rearing up.

To provide even more control or influence over a horse, the first portion, including the shoulder portion, the flank portions and the buttock portion and the retaining portions can be adapted to support stimulating means strategically located along the harness to elicit a particular response. The stimulating means can be removably fixed to the harness by any means known in the art such as by sewing or using an adhesive or snaps. The stimulating means can be any stimulating means known in the art, for example, tacks, ruff edged metal or wooden blocks and the like. Preferably, the stimulating means are remotely and independently activated electrical shocking devices similar to those described in U.S. Pat. No. 6,459,378 B2 to Gerig, U.S. Pat. No. 6,167,843 B1 to Kim and U.S. Pat. No. 5,207,178 to McDade et al., the disclosures of which are incorporated herein by reference. The shocking devices can be activated any number of ways, for example, by a button switch, a remote switch or an inertia switch as described in U.S. Pat. No. 4,199,921 to Watkins.

Preferably, the shocking devices are arranged in the harness to apply an electrical shock about the shoulders and buttocks of the horse. It is further preferred that the shocking means of the present invention be independently and remotely activated so that a trainer can stimulate the horse from a remote location to provide a certain behavioral response. For example, when a horse is moving forward against the wishes of the trainer, a shocking device in the shoulder portion can be electrified to communicate to the horse to stop. Likewise, if a trainer wants a horse to move forward, the shocking means in the buttock portion can be activated. When a horse is pawing at the earth with its right or left hoof, a trainer can activate a shocking device in contact with the shoulder of the horse that is associated with the hoof that is being used to paw to stop the horse from pawing. When riding a horse, if it runs too closely to a tree or fence or the like, the shocking devices adjacent to the tree or the fence can be electrified to cause the horse to move away from the tree or the fence. Thus, the harness of the present invention allows a trainer many training methods when training a horse.

DETAILED DESCRIPTION OF PRESENTLY PREFERRED EMBODIMENTS

Figure 6:
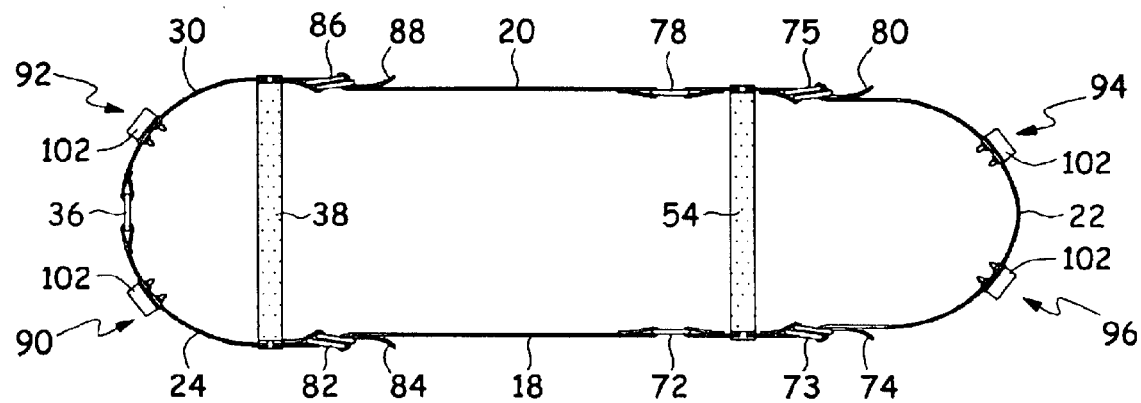
FIG. 6 is a bottom plan view of the harness of FIG. 1 incorporating shocking devices.
Figure 7:
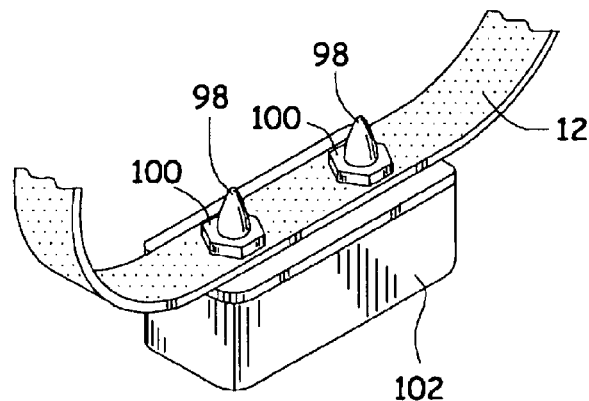
FIG. 7 is a perspective view of a shocking device of FIG. 6.

The preferred embodiment of the present invention is illustrated in FIGS. 1–5, where like portions share like numbering. FIGS. 6–7 illustrate an alternative to the preferred embodiment, where like portions share like numbering with FIGS. 1–5.

Figure 1:
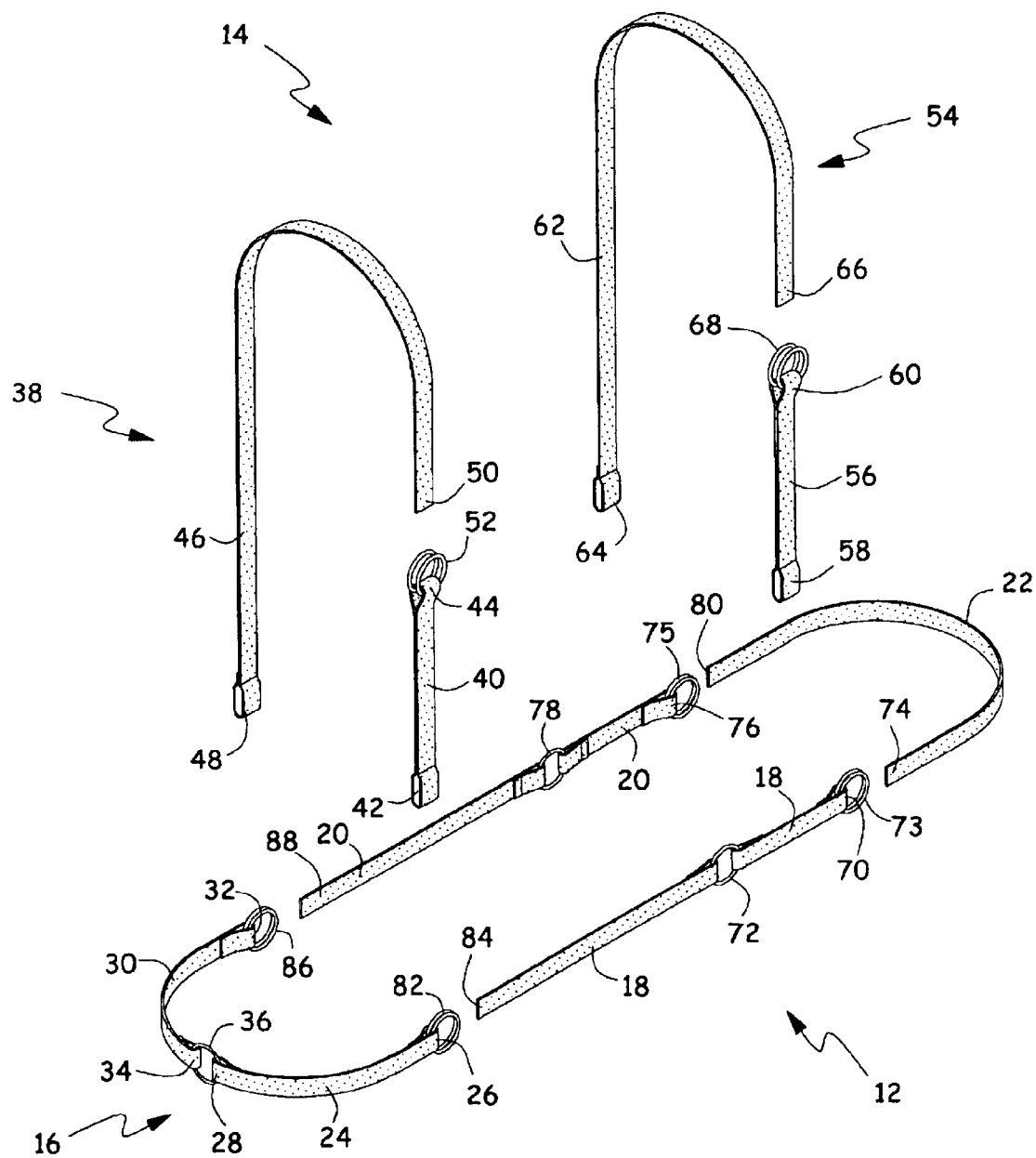
FIG. 1 is an exploded perspective view of a harness in accordance with a first preferred embodiment of the present invention.
Figure 2:
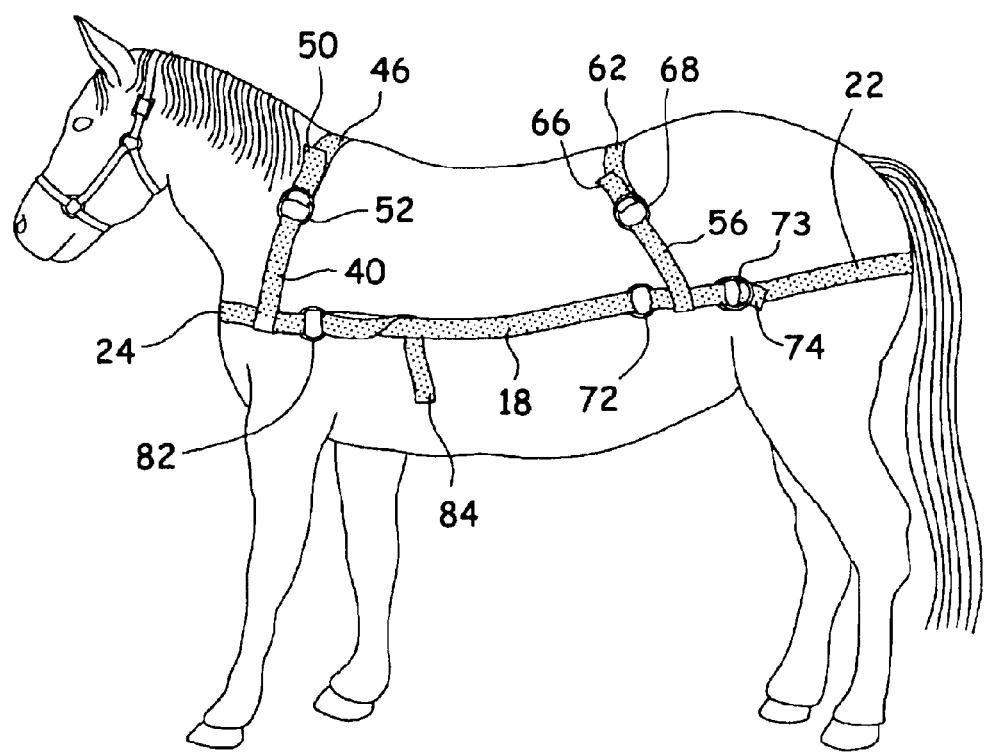
FIG. 2 is a plan view of the left side of the harness of FIG. 1 fitted on a horse.
Figure 3:
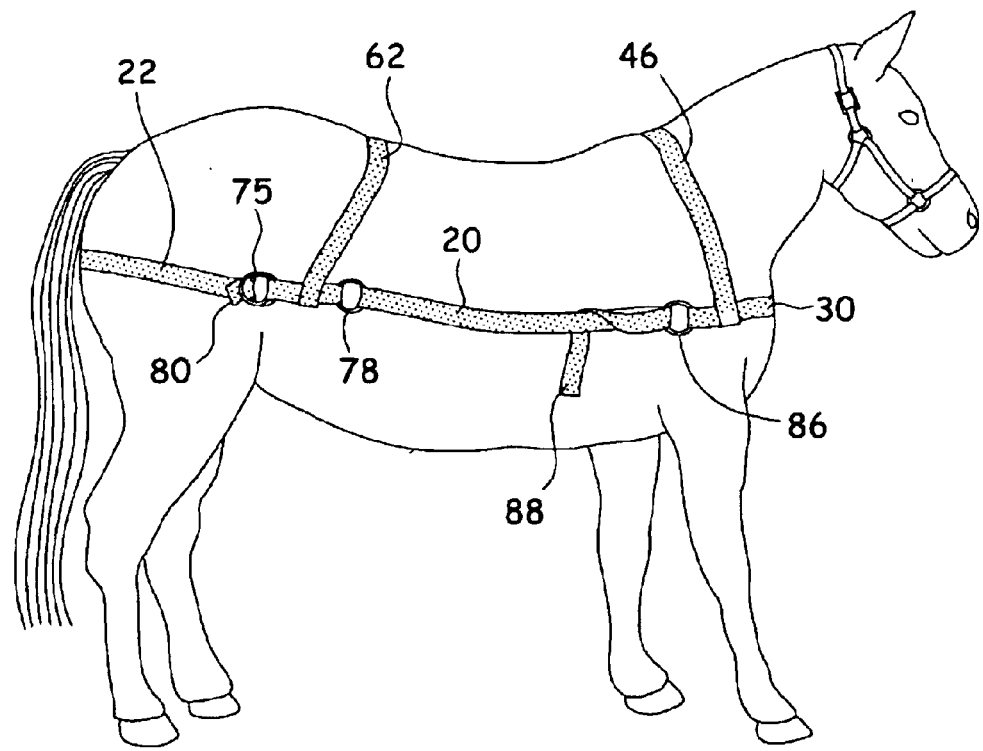
FIG. 3 is a plan view of the right side of the harness of FIG. 2.
Figure 4:
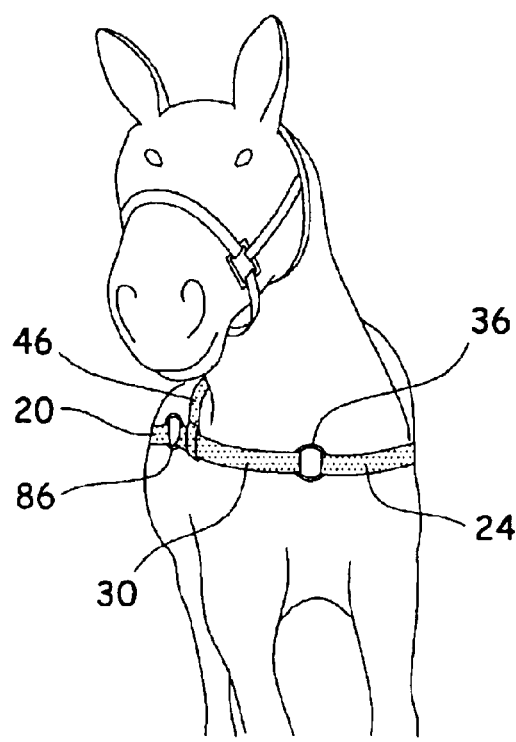
FIG. 4 is front plan view of the harness of FIG. 2.
Figure 5:
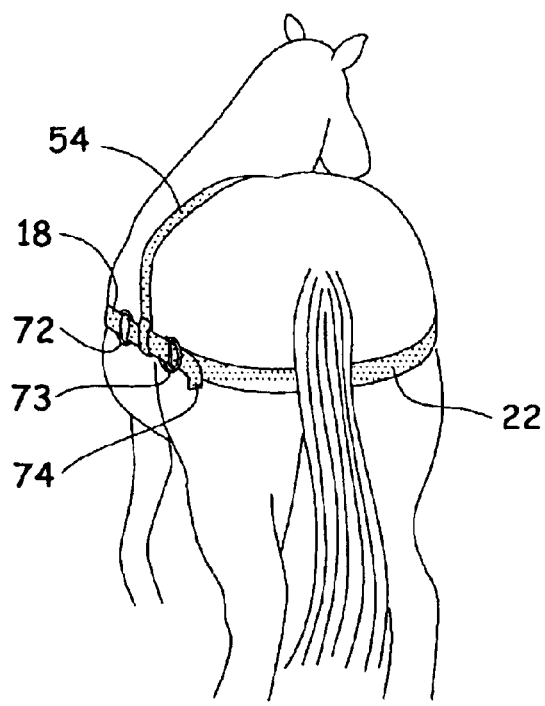
FIG. 5 is a rear plan view of the harness of FIG. 2.

Generally, as illustrated at FIG. 1, a harness 10 in accordance with the preferred embodiment of the present invention includes a first strap 12 adapted to extend around a horse and fit snugly against the shoulders and buttocks thereof and a suspension system 14 for maintaining first strap 12 at a predetermined location across the horse as described in more detail below. Specifically, first strap 12 is divided into a shoulder strap 16 arranged to extend across the shoulders of the horse, a left flank strap 18 arranged to extend along the left side of the horse, a right flank strap 20 arranged to extend along the right side of the horse and a buttock strap 22 arranged to extend across the buttocks of the horse.

More specifically, shoulder strap 16 is divided into a left shoulder strap 24 arranged to extend across the left shoulder of the horse and having a first end 26 and a second end 28 and a right shoulder strap 30 arranged to extend across the right shoulder of the horse and having a third end 32 and a fourth end 34. Left shoulder strap 24 and right shoulder strap 30 are connected to one another at second end 28 and fourth end 34 by a first metal ring 36 arranged to lie substantially between the right and left points of the shoulders of the horse for providing a means of attaching a lead rope to harness 10. To maintain left shoulder strap 24 and right shoulder strap 30 across the respective shoulders of the horse, a first suspension strap 38 is provided. First suspension strap 38 is divided into a left first suspension strap 40 having a fifth end 42 and a sixth end 44 and a right first suspension strap 46 having a seventh end 48 and an eighth end 50. First suspension strap 38 is slideably attached to left shoulder strap 24 at fifth end 42 and to right shoulder strap 30 at seventh end 48. This slideable attachment allows first suspension strap 38 to move along shoulder strap 16 to provide adjustability. Further adjustability is provided by a first double-ring adjustable fastener 52 attached at sixth end 44 of left first suspension strap 40. First fastener 52 allows for the length of first suspension strap 38 to be adjusted by weaving eighth end 50 of right first suspension strap 46 through first fastener 52 and pulling right first suspension strap 46 a sufficient distance through first fastener 52 to position shoulder strap 16 across the points of the shoulders of the horse.

Likewise, to maintain buttock strap 22 across the buttocks about the stifles of the horse, a second suspension strap 54 is provided. Second suspension strap 54 is divided into a left second suspension strap 56 having a ninth end 58 and a tenth end 60 and a right second suspension strap 62 having an eleventh end 64 and a twelfth end 66. Second suspension strap 54 is slideably attached to buttock strap 22 in a spaced apart fashion at ninth end 58 and at eleventh end 64. This slideable attachment allows second suspension strap 54 to move along buttock strap 22 to provide adjustability. Further adjustability is provided by a second double-ring adjustable fastener 68 attached at tenth end 60 of left second suspension strap 56. Second fastener 68 allows for the length of second suspension strap 54 to be adjusted by weaving twelfth end 66 of right second suspension strap 62 through second fastener 68 and pulling right second suspension strap 62 a sufficient distance through second fastener 62 to position buttock strap 22 across the buttocks about the stifles.

Shoulder strap 16 and buttock strap 22 are connected via left flank strap 18 and right flank strap 20. As illustrated in FIG. 1, left flank strap 18 is divided into two connected portions by a second ring 72 and is fixedly joined at a thirteenth end 70 to a fifth fastener 73. Fifth fastener 73 is adapted to receive buttock strap 22 at a fourteenth end 74 thereof to adjustably connect left flank strap 18 with buttock strap 22. Similarly, right flank strap 20 divided into two connected portions by a third ring 78 and is fixedly joined at a fifteenth end 76 thereof to a sixth fastener 75. Sixth fastener 75 is adapted to receive buttock strap 22 at a sixteenth end 80 thereof to adjustably connect right flank strap 20 with buttock strap 22. To adjustably connect shoulder strap 16 with buttock strap 22, first end 26 of left shoulder strap 24 is fitted with a third double-ring fastener 82 adapted to receive a seventeenth end 84 of left flank strap 18, and third end 32 is fitted with a fourth double-ring fastener 86 adapted to receive an eighteenth end 88 of right flank strap 20. Seventeenth end 84 and eighteenth end 88 are pulled sufficient distances through third fastener 82 and fourth fastener 86, respectively, to cause shoulder strap 16 to exert pressure against the shoulders of the horse and to cause buttock strap 22 to exert pressure against the buttocks of the horse.

As illustrated in FIGS. 6 and 7, shoulder strap 16 and buttock strap 22 can be adapted to support electrical shocking devices 90, 92 and 94, 96, respectively, that are strategically located therein to apply an electrical shock independently about each shoulder or each buttock of the horse. As best illustrated in FIG. 7, each shocking device 90, 92 and 94, 96 includes a pair of electrodes 98 of sufficient length to protrude through first strap 12 and to contact the horse's skin. Each one of the pair of electrodes 98 includes a flange 100 thereabout having a diameter greater than each one of electrodes 98 such that each shocking device is maintained on first strap 12 by sandwiching first strap 12 between flange 100 and a box 102 electrically connected to electrodes 98 through first strap 12 and adapted for producing an electrical shock to be carried by electrodes 98 to the horse. Box 102 houses a receiver circuit (not shown) which receives a signal transmitted from a transmitter (not shown), an electrical shock producer (not shown) including a direct current (DC) power supply (not shown), a charging capacitor (not shown), a transformer (not shown), a switching device (not shown) and a transient voltage suppressor or voltage limiting device (not shown).

As will be apparent to one skilled in the art, various modifications can be made within the scope of the aforesaid description. Such modifications being within the ability of one skilled in the art form a part of the present invention and are embraced by the claims below.

What is claimed is:

1. A harness for a quadruped comprising,
a first strap adapted to extend around the quadruped, the first strap including a buttock portion and a shoulder portion,
a second strap connected with the first strap and arranged to maintain the shoulder portion at a first predetermined location on the quadruped, and
a third strap connected with the first strap and arranged to maintain the buttock portion at a second predetermined location on the quadruped,
wherein the second strap is adapted and arranged to move along the length of the first strap independently of the third strap.

2. The harness according to claim 1 wherein the first predetermined location is about the shoulders of the quadruped and the second predetermined location is about the buttocks of the quadruped.

3. A harness according to claim 1 wherein the second strap is movably connected with the shoulder portion.

4. A harness according to claim 1 further comprising a first member integral with and substantially centrally located along the length of the shoulder portion for connecting a lead rope to the harness.

5. A method of leading a quadruped comprising,
placing the harness according to claim 4 onto the quadruped,
attaching a lead rope to the first member, and
pulling the lead rope in a direction.

6. A harness according to claim 1 wherein the second strap is arranged to move along the length of the first strap independently of any fourth strap.

7. A harness according to claim 1 wherein the second strap and the third strap are adjustable.

8. A harness according to claim 1 wherein the third strap is movably connected with the buttock portion.

9. A harness in accordance with claim 1 wherein the shoulder portion and the buttock portion are adjustably connected.

10. A harness in accordance with claim 1 further comprising a plurality of second members integral with and arranged on the first strap for connecting the harness with one or more stationary objects.

11. A harness in accordance with claim 1 wherein the third strap is adapted and arranged to move alone the length of the first strap independently of the second strap.

12. A harness for a quadruped comprising,
a first strap adapted to extend around the quadruped, the first strap including a buttock portion and a shoulder portion having a length,
a second strap for maintaining the shoulder portion at a first predetermined location on the quadruped,
a third strap for maintaining the buttock portion at a second predetermined location on the quadruped,
a first stimulating means supported by the shoulder portion, and
a second stimulating means supported by the buttock portion,
wherein the first predetermined location is about the shoulders of the quadruped and the second predetermined location is about the buttocks of the quadruped.

13. The harness according to claim 12 wherein the first stimulating means includes a first electrical shock device and the second stimulating means comprises a second electrical shock device.

14. The harness according to claim 13 wherein the first electrical shock device includes a first pair of electrodes spaced apart from a second pair of electrodes, the first pair of electrodes being arranged to apply an electrical shock about one shoulder of the quadruped when activated and the second pair of electrodes being arranged to apply an electrical shock about the other shoulder of the quadruped when activated.

15. The harness according to claim 14 wherein the second electrical shock device includes a third pair of electrodes spaced apart from a fourth pair of electrodes, the third pair of electrodes being arranged to apply an electrical shock about one buttock of the quadruped and the fourth pair of electrodes being arranged to apply an electrical shock about the other buttock of the quadruped.

16. The harness according to claim 15 wherein the first pair of electrodes, the second pair of electrodes, the third pair of electrodes and the fourth pair of electrodes are adapted to be remotely activated to apply a shock to the quadruped.

17. A method of influencing the behavior of a quadruped comprising,
placing the harness according to claim 15 on the quadruped,
selectively activating the first pair of electrodes, the second pair of electrodes, the third pair of electrodes or the fourth pair of electrodes or any combination thereof to obtain a desired behavior.

18. A method of discouraging a quadruped from scratching a surface comprising,
placing the harness according to claim 15 onto the quadruped, and
activating a pair of electrodes selected from the group consisting of the first pair of electrodes, the second pair of electrodes, the third pair of electrodes and the fourth pair of electrodes, to apply an electrical shock to the quadruped above the appendage of the quadruped used by the quadruped for scratching the surface.

19. The harness according to claim 13 wherein the first shocking device and the second shocking device are adapted to be remotely activated to apply a shock to the quadruped.

20. A method of influencing the behavior of a quadruped comprising, placing a plurality of shocking devices on a quadruped, wherein the plurality of shocking devices includes a first shocking means positioned on one of the quadruped's shoulders, a second shocking means positioned on the quadruped's other shoulder, a third shocking means positioned on one of the quadruped's buttocks and a fourth shocking means positioned on the quadrupeds other buttock, and selectively activating the first shocking means, the second shocking means, the third shocking means, the fourth shocking means or any combination thereof for obtaining a desired behavior.

21. A training harness for a quadruped comprising, a left shoulder portion having a first end and a second end and a right shoulder portion having a third end and a fourth end, wherein the first end and the third end are connected with a first member, a first adjustable retaining portion having a fifth end and a sixth end wherein the fifth end is connected with the left shoulder portion and the sixth end is connected with the right shoulder portion, a rear portion including a buttock portion having a seventh end and an eighth end, a left flank portion having a ninth end and a tenth end, and a right flank portion having an eleventh end and a twelfth end, wherein the tenth end and the seventh end are connected with a second member and the twelfth end and the eighth end are connected with a third member, a second adjustable retaining portion having a thirteenth end and a fourteenth end wherein the thirteenth end and the fourteenth end are connected with the rear portion in a spaced apart arrangement, means of adjustably connecting the second end to the ninth end, and means of adjustably connecting the fourth end with the eleventh end, wherein the first adjustable retaining portion is adapted and arranged to move alone the length of the left shoulder portion and the length of the right shoulder portion rear portion independently of the second adjustable retaining portion and the second adjustable portion is adapted and arranged to move along the length of the rear portion independently of the first adjustable portion.

22. A harness for a quadruped comprising, a first strap adapted to extend around the quadruped, the first strap including a buttock portion and a shoulder portion, a second strap for maintaining the shoulder portion at a first predetermined location on the quadruped, a third strap for maintaining the buttock portion at a second predetermined location on the quadruped, and a stimulating means supported by the first strap.

23. The harness according to claim 22 wherein the first predetermined location is about the shoulders of the quadruped and the second predetermined location is about the buttocks of the quadruped.

24. The harness according to claim 22 comprising a plurality of stimulating means.

25. The harness according to claim 22 wherein the stimulating means is supported by the buttock portion.

26. The harness according to claim 22 wherein the stimulating means is supported by the shoulder portion.

* * * * *

UNITED STATES PATENT AND TRADEMARK OFFICE
CERTIFICATE OF CORRECTION

PATENT NO. : 6,769,235 B1
DATED : August 3, 2004
INVENTOR(S) : Barry D. Hayes

It is certified that error appears in the above-identified patent and that said Letters Patent is hereby corrected as shown below:

<u>Column 8,</u>
Line 11, delete the word "alone" and insert -- along --

Signed and Sealed this

First Day of February, 2005

JON W. DUDAS
*Director of the United States Patent and Trademark Office*